(12) United States Patent
Lee

(10) Patent No.: US 9,690,698 B2
(45) Date of Patent: Jun. 27, 2017

(54) CONTROLLER INCLUDING MAP TABLE, MEMORY SYSTEM INCLUDING SEMICONDUCTOR MEMORY DEVICE, AND METHOD OF OPERATING THE SAME

(71) Applicant: SK hynix Inc., Gyeonggi-do (KR)

(72) Inventor: Jong Min Lee, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 115 days.

(21) Appl. No.: 14/715,210

(22) Filed: May 18, 2015

(65) Prior Publication Data

US 2016/0170898 A1    Jun. 16, 2016

(30) Foreign Application Priority Data

Dec. 10, 2014  (KR) .................. 10-2014-0177759

(51) Int. Cl.
*G06F 12/02*    (2006.01)

(52) U.S. Cl.
CPC ...... *G06F 12/0246* (2013.01); *G06F 12/0292* (2013.01); *G06F 2212/1016* (2013.01); *G06F 2212/1041* (2013.01); *G06F 2212/202* (2013.01); *G06F 2212/657* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 2006/0149902 A1* | 7/2006 | Yun | ...................... | G06F 12/0866 711/118 |
| 2007/0233941 A1* | 10/2007 | Lee | ...................... | G06F 12/0246 711/103 |
| 2008/0098195 A1* | 4/2008 | Cheon | ................. | G06F 12/0246 711/202 |
| 2008/0126712 A1* | 5/2008 | Mizushima | ......... | G06F 11/1415 711/141 |
| 2008/0270680 A1* | 10/2008 | Chang | .................... | G11C 16/10 711/103 |
| 2010/0037009 A1* | 2/2010 | Yano | .................... | G06F 12/0246 711/103 |
| 2010/0138592 A1* | 6/2010 | Cheon | ................. | G06F 12/0246 711/103 |
| 2010/0274952 A1* | 10/2010 | Lee | ...................... | G06F 12/0292 711/103 |

(Continued)

FOREIGN PATENT DOCUMENTS

KR  1020130098642  9/2013
KR  1020140040137  4/2014

*Primary Examiner* — Mano Padmanabhan
*Assistant Examiner* — Jean Edouard
(74) *Attorney, Agent, or Firm* — IP & T Group LLP

(57) ABSTRACT

A memory system and a method of operating the same are provided. The method includes storing a first map table including a mapping relation between first physical addresses specifying pages of memory blocks having multi-level cells and first logical addresses, storing first logical address groups of the first logical addresses as meta information, determining a second logical address group of a request address, detecting whether the second logical address group is in the first logical address groups of the meta information, and searching for the request address in the first map table based on the detecting result.

15 Claims, 7 Drawing Sheets

(56) References Cited

U.S. PATENT DOCUMENTS

| | | | |
|---|---|---|---|
| 2011/0072188 A1* | 3/2011 | Oh | G06F 3/061 711/102 |
| 2011/0145485 A1* | 6/2011 | Chun | G06F 12/0246 711/103 |
| 2012/0179859 A1* | 7/2012 | Kim | G06F 12/0246 711/103 |
| 2012/0239854 A1* | 9/2012 | Hsueh | G06F 12/0866 711/103 |
| 2012/0239855 A1* | 9/2012 | Tootoonchian | G06F 12/1009 711/103 |
| 2012/0239862 A1* | 9/2012 | Seo | G06F 12/0246 711/103 |
| 2012/0254581 A1* | 10/2012 | Kim | G11C 11/5621 711/203 |
| 2012/0311237 A1* | 12/2012 | Park | G06F 12/0246 711/103 |
| 2013/0054928 A1* | 2/2013 | Im | G06F 12/0246 711/170 |
| 2013/0114354 A1* | 5/2013 | Ryu | G11C 11/5628 365/189.011 |
| 2013/0151759 A1* | 6/2013 | Shim | G06F 12/0246 711/103 |
| 2013/0166825 A1* | 6/2013 | Kim | G06F 12/0246 711/103 |
| 2013/0173954 A1* | 7/2013 | Woo | G06F 11/167 714/6.13 |
| 2013/0185485 A1* | 7/2013 | Kim | G06F 12/0246 711/103 |
| 2013/0238838 A1* | 9/2013 | Fukutomi | G06F 12/0246 711/103 |
| 2013/0275657 A1* | 10/2013 | Kim | G06F 3/0613 711/103 |
| 2013/0326121 A1* | 12/2013 | Cheng | G06F 12/0246 711/103 |
| 2014/0059275 A1* | 2/2014 | Yun | G06F 12/0246 711/103 |
| 2014/0082265 A1* | 3/2014 | Cheng | G06F 12/0246 711/103 |
| 2014/0082323 A1* | 3/2014 | Li | G06F 12/0246 711/207 |
| 2014/0089630 A1* | 3/2014 | Pignatelli | G06F 12/1009 711/206 |
| 2014/0136767 A1* | 5/2014 | Lee | G06F 12/0246 711/103 |
| 2014/0181371 A1* | 6/2014 | Thomas | G06F 12/0246 711/103 |
| 2014/0237286 A1* | 8/2014 | Jung | G11C 29/76 714/6.13 |
| 2014/0281188 A1* | 9/2014 | Kwon | G06F 12/1009 711/104 |
| 2015/0143029 A1* | 5/2015 | Sivasankaran | G06F 3/061 711/103 |

* cited by examiner

FIG. 6

MPT1

| LOGICAL ADDRESSES | PHYSICAL ADDRESSES | |
|---|---|---|
| LAN100 | | PP11 |
| LAN200 | | PP12 |
| LAN50 | BLK2 | PP13 |
| LAN77 | | PP14 |
| LAN140 | | PP15 |

FIG. 7

MPT2

| LOGICAL ADDRESSES | PHYSICAL ADDRESSES | | |
|---|---|---|---|
| LAN0 | | PP21 | LP1 |
| LAN1 | | PP21 | LP2 |
| LAN2 | | PP22 | LP1 |
| LAN3 | BLKx | PP22 | LP2 |
| LAN4 | | PP23 | LP1 |
| LAN5 | | PP23 | LP2 |
| LAN6 | | PP24 | LP1 |
| LAN4r | | PP21 | LP1 |
| LAN4r+1 | BLKx+1 | PP21 | LP2 |
| LAN4r+2 | | PP22 | LP1 |

FIG. 8

MMPT

| LOGICAL ADDRESSES | PHYSICAL ADDRESSES |
|---|---|
| LAN0 | PAN0 |
| LAN1 | PAN1 |
| ⋮ | |
| LANp | PANp |

FIG. 9

| LOGICAL ADDRESSES IN MPT2 |
|---|
| LAN0 |
| LAN1 |
| LAN2 |
| LAN3 |
| LAN4 |
| LAN5 |
| LAN6 |
| LAN4r |
| LAN4r+1 |
| LAN4r+2 |

METI

| |
|---|
| LAGR0 |
| LAGR1 |
| LAGRr |

CONTROLLER INCLUDING MAP TABLE, MEMORY SYSTEM INCLUDING SEMICONDUCTOR MEMORY DEVICE, AND METHOD OF OPERATING THE SAME

CROSS-REFERENCE TO RELATED APPLICATION

The present application claims priority to Korean patent application number 10-2014-0177759, filed on Dec. 10, 2014, the entire disclosure of which is herein incorporated by reference in its entirety.

BACKGROUND

Field of Invention

The present invention relates to an electronic device and, more particularly, to a controller including a map table and a memory system including a semiconductor memory device.

Description of Related Art

Semiconductor memory devices are memory devices that use semiconductor materials such as silicon (Si), germanium (Ge), gallium arsenide (GaAs), indium phosphide (InP), or the like. Semiconductor memory devices are generally classified as either volatile memory devices or non-volatile memory devices.

A volatile memory device loses its stored data when its power supply is cut off. Volatile memory devices include static random access memory (SRAM), dynamic RAM (DRAM), synchronous DRAM (SDRAM), and the like. Non-volatile memory devices are memory devices that can retain their stored data even without a constant source of power. Non-volatile memory devices include read-only memory (ROM), programmable ROM (PROM), erasable programmable ROM (EPROM), electrically erasable programmable ROM (EEPROM), flash memory, phase-change RAM (PRAM), magnetoresistive RAM (MRAM), resistive RAM (RRAM), ferroelectric RAM (FRAM), or the like. Flash memories are generally classified as being either NOR type or NAND type.

SUMMARY

The present invention is directed to a memory system having improved operating speed and a method of operating the same.

One aspect of the present invention provides a method of operating a memory system including a semiconductor memory device, which includes first memory blocks having multi-level cells. The method may include storing a first map table including a mapping relation between first physical addresses specifying pages of the first memory blocks and first logical addresses among a plurality of logical addresses wherein the plurality of logical addresses are received from a host as a request address and divided into a plurality of logical address groups, storing first logical address groups of the first logical addresses, among the plurality of logical address groups, as meta information, determining a logical address group in which the request address is included, among the plurality of logical address groups as a second logical address group, and detecting whether the second logical address group is in the first logical address groups of the meta information, and searching for the request address in the first map table based on the detecting result.

As an embodiment, the searching of the request address may be performed when the second logical address group is in the first logical address groups of the meta information.

As an embodiment, the semiconductor memory device may further include second memory blocks having single-level cells.

As an embodiment, the method of operating the memory system may further include storing a second map table including a mapping relation between second physical addresses specifying pages of the second memory blocks and second logical addresses among the plurality of logical addresses.

As an embodiment, the method of operating the memory system may further include searching for the request address in the second map table when the second logical address group is not in the first logical address groups of the meta information.

As an embodiment, the method of operating the memory system may further include storing a third map table including a mapping relation between the plurality of logical addresses and third physical addresses, and the third physical addresses may specify the pages of the first and second memory.

As an embodiment, the method of operating the memory system may further include detecting of a physical address corresponding to the request address from the second map table when the request address is in the second logical addresses in the second map table, and searching for the request address in the third map table when the request address is not in the second logical addresses in the second map table.

As an embodiment, the method of operating the memory system may further include detecting a physical address corresponding to the request address from the third map table.

Another aspect of the present invention provides a memory system, including a semiconductor memory device including first memory blocks having multi-level cells and second memory blocks having single-level cells, and a controller suitable for controlling the semiconductor memory device based on a plurality of logical addresses, wherein the plurality of logical addresses are received from a host as a request address and divided into a plurality of logical address groups, wherein the controller includes a RAM suitable for storing a first map table including a mapping relation between first physical addresses specifying pages of the first memory blocks and first logical addresses among the plurality of logical addresses, and a flash translation layer suitable for storing first logical address groups of the first logical addresses, among the plurality of logical address groups, as meta information in the RAM. The flash translation layer may determine a logical address group in which the request address is included, among the plurality of logical address groups as a second logical address group, and search for the request address in the first map table when the second logical address group is in the first logical address groups of the meta information.

As an embodiment, the RAM may store a second map table including a mapping relation between second physical addresses specifying pages of the second memory blocks and second logical addresses among the plurality of logical addresses.

As an embodiment, the flash translation layer may search for the request address in the second map table when the second logical address group is not in the first logical address groups of the meta information.

As an embodiment, the flash translation layer may detect a physical address corresponding to the request address from the first map table when the request address is detected in the first map table, and search for the request address in the second map table when the request address is not detected from the first map table.

As an embodiment, the RAM may store a third map table including a mapping relation between the plurality of logical addresses and third physical addresses, and the third physical addresses may specify the pages of the first and second memory blocks.

As an embodiment, the flash translation layer may search for the request address in the third map table when the second logical address group is not in the first logical address groups of the meta information.

As an embodiment, the flash translation layer may detect a physical address corresponding to the request address from the first map table when the request address is detected from the first map table, and search for the request address in the third map table when the request address is not detected from the first map table.

BRIEF DESCRIPTION OF THE DRAWINGS

FIG. 6 is a diagram showing a first map table of FIG. 1;

FIG. 7 is a diagram showing a second map table of FIG. 1;

FIG. 8 is a diagram showing a main map table of FIG. 1;

FIG. 9 is a diagram for describing meta information according to an embodiment of the present invention;

DETAILED DESCRIPTION

Exemplary embodiments of the present invention will be described more fully hereinafter with reference to the accompanying drawings. In the specification, only portions needed for understanding of the present invention will be described so that the subject matter of the present invention is not obscured. The present invention may, however, be embodied in different forms and should not be construed as limited to the embodiments set forth herein. Exemplary embodiments of the present invention are described below in sufficient detail with reference to accompanying drawings to enable those of ordinary skill in the art to embody and practice the present invention.

Throughout the specification, it will be understood that when an element is referred to as being "connected" or "coupled" to another element, it can be directly connected or coupled to the other element or Intervening elements may be present. It will be further understood that the terms "com-prises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
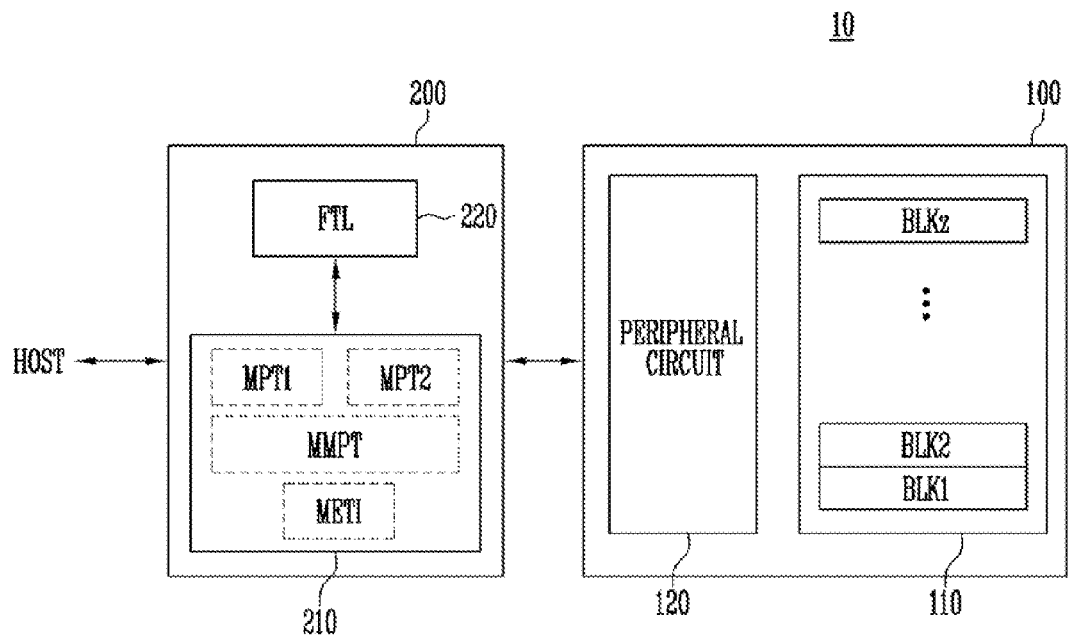
FIG. 1 is a block diagram illustrating a memory system according to an exemplary embodiment of the present invention.
Figure 2:
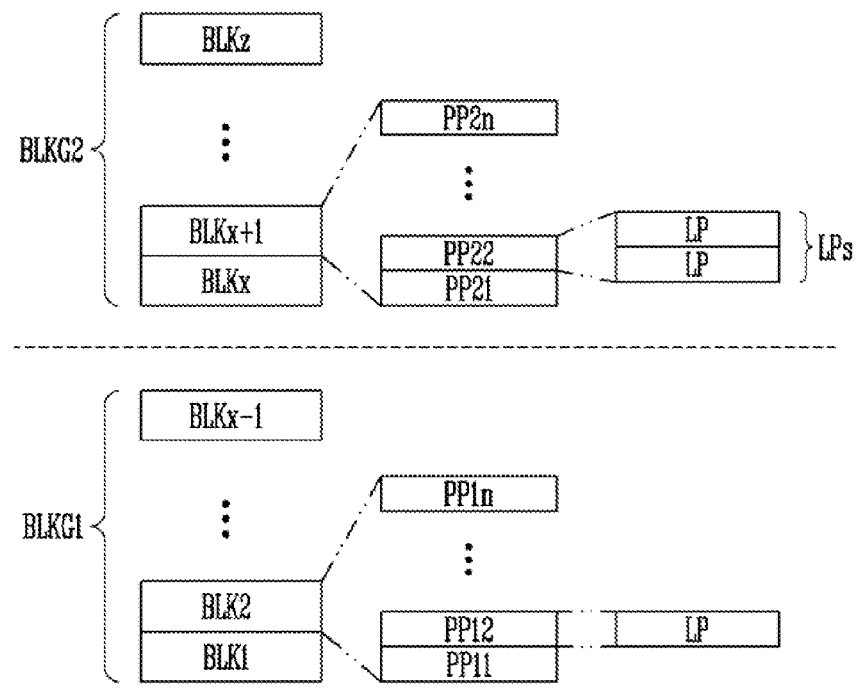
FIG. 2 is a diagram illustrating memory blocks included in a semiconductor memory device of FIG. 1.

FIG. 1 is a block diagram illustrating a memory system 10 according to an exemplary embodiment of the present invention. FIG. 2 is a diagram illustrating memory blocks BLK1 to BLKz included in a semiconductor memory device 100 shown in FIG. 1.

Referring to FIG. 1, the memory system 10 may include the semiconductor memory device 100 and a controller 200.

The semiconductor memory device 100 may be controlled to operate by the controller 200. The semiconductor memory device 100 may include a memory cell array 110, and a peripheral circuit 120 for driving the memory cell array 110. The memory cell array 110 may include a plurality of memory blocks BLK1 to BLKz. Each of the plurality of memory blocks BLK1 to BLKz may include a plurality of non-volatile memory cells.

As an embodiment, each memory block may include single-level cells, or multi-level cells. A part of the plurality of memory blocks BLK1 to BLKz may include single-level cells while the other parts include multi-level cells. The single-level cell may store one bit of data per one memory cell. The multi-level cell may store multi-bit data per one memory cell.

Referring to FIG. 2, the plurality of memory blocks BLK1 to BLKz may be divided into a plurality of memory block groups BLKG1 to BLKG2. The first memory block group BLKG1 may include first to (x−1)-th memory blocks BLK1 to BLKx−1. At this time, the memory cells included in the first to (x−1)-th memory blocks BLK1 to BLKx−1 may be defined as the single-level cells. Each of the memory blocks BLK1 to BLKx−1 of the first memory block group BLKG1 may include first to n-th physical pages PP11 to PP1*n*, and each of the first to n-th physical pages PP11 to PP1*n* may include one logical page LP. That is, only the least significant bit of data may be stored in each of the memory cells configuring one physical page, and the memory cells may configure one logical page with the least significant bits of data stored therein.

The second memory block group BLKG2 may include x-th to z-th memory blocks BLKx to BLKz. Memory cells included in the x-th to z-th memory blocks BLKx to BLKz may be defined as multi-level cells. Each of the memory blocks BLKx to BLKz of the second memory block group BLKG2 may include first to n-th physical pages PP21 to PP2*n*, and each of the first to n-th physical pages PP21 to PP2*n* may include two or more logical pages LPs. For example, the least significant bits of data stored in the memory cells configuring one physical page may configure one logical page, and the most significant bits of data stored in corresponding memory cells may configure another logical page.

That is, the physical page of the first memory block group BLKG1 may include one logical page LP, and the physical page of the second memory block group BLKG2 may include a plurality of logical pages LPs. Hereinafter, for a simple explanation, an example where each of the memory cells of the x-th to z-th memory blocks BLKx to BLKz stores two bits of data will be used.

When the memory cells are used as single-level cells, it is well known that a program operation on corresponding memory cells is rapidly performed. For example, each of the memory cells may be programmed to have one of two threshold voltage states to store the least significant bit of data. On the other hand, when the memory cells are used as the multi-level cells, the program operation on corresponding memory cells is performed relatively slowly. For example, in order to store the most significant bit in each of the memory cells, the least significant bits stored in corresponding memory cells may be read, and each of the corresponding memory cells may be programmed to have one among four threshold voltage states based on the read data. The time consumed for performing operations of reading the least significant bits and programming each of the memory cells as one among four threshold voltage states may be longer than the time consumed for performing a program operation of storing the least significant bit of data.

Referring to FIG. 1 again, the peripheral circuit 120 may be connected to the memory cell array 110. The peripheral circuit 120 may be controlled to operate by the controller 200. The peripheral circuit 120 may be controlled to program data in the memory cell array 110, read the data from the memory cell array 110, and erase the data of the memory cell array 110, by the controller 200.

As an embodiment, a read operation and a program operation of the semiconductor memory device 100 may be performed by logical pages. An erase operation of the semiconductor memory device 100 may be performed by memory blocks. That is, the read and program operations of the semiconductor memory device 100 may be performed on each logical page, and the erase operation of the semiconductor memory device 100 may be performed on each memory block, as a basic unit.

In the program operation, the peripheral circuit 120 may receive write data and a physical address from the controller 200. One memory block and one physical page included therein may be specified by the physical address. A logical page in the corresponding physical page may be specified by the physical address. The peripheral circuit 120 may program the write data in the corresponding physical page. For example, the write data may be stored as the least significant bits of data of the corresponding physical page. For example, the write data may be stored as the most significant bits of data of the corresponding physical page.

In the read operation, the peripheral circuit 120 may receive the physical address from the controller 200. One memory block and the physical page included therein may be specified by the physical address. A logical page in the corresponding physical page may be specified by the physical address. The peripheral circuit 120 may read the least significant bits or the most significant bits of data from the corresponding physical page, and output the read data to the controller 200.

In the erase operation, the physical address transferred from the controller 200 to the peripheral circuit 120 may specify one memory block. The peripheral circuit 120 may erase data of the memory block corresponding to the physical address.

As an embodiment, the semiconductor memory device 100 may be a flash memory device.

The controller 200 may include a flash translation layer (FTL) 220 and a random access memory (RAM) 210.

The controller 200 may control various operations of the semiconductor memory device 100. The controller 200 may be configured to access the semiconductor memory device 100 at the request of a host. For example, the controller 200 may be configured to control the read, write, erase, and background operations of the semiconductor memory device 100. The controller 200 may be configured to provide an interface between the semiconductor memory device 100 and the host. The controller 200 may be configured to drive firmware for controlling the semiconductor memory device 100.

The RAM 210 may be controlled to operate by the FTL 220. The RAM 210 may store first and second map tables MPT1 and MPT2, and a main map table MMPT.

The first map table MPT1 may include a mapping relation between the physical addresses specifying at least one portion among the pages of the memory blocks BLK1 to BLKx−1 in the first memory block group BLKG1 and corresponding logical addresses. The second map table MPT2 may include a mapping relation between the physical addresses specifying at least one portion among the pages of the memory blocks BLKx to BLKz in the second memory block group BLK2 and corresponding logical addresses. The main map table MMPT may include a mapping relation between the pages of the memory blocks BLK1 to BLKz and corresponding logical addresses.

According to an embodiment of the present invention, the RAM 210 may further store meta information METI. The meta information METI may represent logical address groups in which the logical addresses in the second map table MPT2 are included.

As an embodiment, the RAM 210 may be a static random access memory (SRAM), a dynamic random access memory (DRAM), a synchronous DRAM (SDRAM), etc.

As an embodiment, the RAM 210 may be used as an operating memory of the FTL 220. As an embodiment, the RAM 210 may be used as a buffer memory between the semiconductor memory device 100 and the host. For example, in the read operation, data read from the semiconductor memory device 100 may be temporarily stored in the RAM 210, and outputted to the host. In the program operation, write data received from the host may be temporarily stored in the RAM 210, and provided to the semiconductor memory device 100.

The FTL 220 may access the semiconductor memory device 100 at the request of the host. A request of the program operation from the host may include a logical address and write data. A request of the read operation from the host may include the logical address. Hereinafter, the logical address which is previously received from the host may be defined as a request address.

When the request of the program operation is received, the FTL 220 may convert the request address into the physical address, and update the mapping relation between the request address and the physical address in the first or second map table MPT1 or MPT2. After this, the FTL 220 may update information of the first and second map tables MPT1 and MPT2 in the main map table MMPT.

The FTL 220 may store the mapping information of the main map table MMPT in at least one memory block (for example, BLK1, hereinafter, meta block) of the semiconductor memory device 100. When update information is in the main map table MMPT, the updated information is to be written in the meta block of the semiconductor memory device 100. That is, the mapping information of the main map table MMPT may be synchronized with that of the meta block.

For example, the mapping relation between the request address and the physical address is updated in the main map table MMPT. The mapping information of the main map table MMPT may be synchronized with that of the meta block at an unsuitable time due to a frequent update operation on the main map table MMPT, and thus the operating speed of the memory system 10 may be decreased. When the main map table MMPT corresponds to a cache miss, and a portion of the mapping information of the main map table MMPT is discarded and is substituted with that of the meta block, an operation of firstly updating the discarded mapping information in the meta block may be required. For example, when there is discarded data in the first or second map table MPT1 or MPT2, the operation of programming the discarded data in the meta block may not be required. Accordingly, in the program operation, the operating speed of the memory system 10 may be increased since the mapping relation between the logical address and the physical address is not updated in the main map table MMPT, which needs to be synchronized with the meta block, but preferentially updated in the first or second map table MPT1 or MPT2.

For example, the FTL 220 may periodically update the mapping information of the first and second map tables MPT1 and MPT2 in the main map table MMPT. When an access request from the host is not received for a predetermined time, the FTL 220 may update the mapping information of the first and second map tables MPT1 and the MPT2 in the main map table MMPT.

When the request address corresponds to the first memory block group BLKG1, the FTL 220 may update the mapping relation between the request address and a corresponding physical address in the first map table MPT1. For example, the FTL 220 may generate the physical address corresponding to the request address, and when the generated physical address corresponds to the first memory block group BLKG1, the FTL 220 may update the mapping relation between the request address and the corresponding physical address in the first map table MPT1. For example, when the request address corresponds to the second memory block group BLKG2, the FTL 220 may update the mapping relation between the request address and the corresponding physical address in the second map table MPT2.

As a result, the first map table MPT1 may include a mapping relation between the physical addresses specifying at least one portion among the pages of the memory blocks BLK1 to BLKx−1 in the first memory block group BLKG1 and corresponding logical addresses. The second map table MPT2 may include a mapping relation between the physical addresses specifying at least one portion among the pages of the memory blocks BLKx to BLKz in the second memory block group BLKG2 and corresponding logical addresses.

As is well known, since the program operation of the semiconductor memory device 100 is performed by pages (for example, 4K byte), the semiconductor memory device 100 may have a low program operating speed when random request addresses are received, and may have a high program operating speed when sequential request addresses are received. The FTL 220 may select the first memory block group BLKG1 having a relatively high program speed when the random request addresses are received, and select the second memory block group BLKG2 having a relatively low program speed when the sequential request addresses are received.

The FTL 220 may map the random request addresses to the physical addresses specifying the pages in the first memory block group BLKG1. For example, when the request addresses corresponding to one sector (for example, 256 byte) are repeatedly received from the host, the corresponding request addresses may be mapped to the physical addresses specifying a specific page in the first memory block group BLKG1.

On the other hand, the FTL 220 may map the sequential request addresses to the physical addresses specifying the pages in the second memory block group BLKG2. For example, when the request addresses corresponding to eight sectors (for example, 256 byte×8) are received at once, the corresponding request addresses may be mapped to the physical addresses specifying a specific page in the second memory block group BLKG2.

Meanwhile, the FTL 220 may search for the request address in the first or second map table MPT1 or the MPT2 when a request of the read operation is received, and extract the physical address. When the corresponding logical address is not in the first or second map table MPT1 or the MPT2, the FTL 220 may extract the physical address corresponding to the logical address from the main map table MMPT.

According to an embodiment of the present invention, the FTL 220 may further store the meta information METI in the RAM 210. The meta information METI may represent logical address groups in which the logical addresses in the second map table MPT2 are included.

Figure 3:
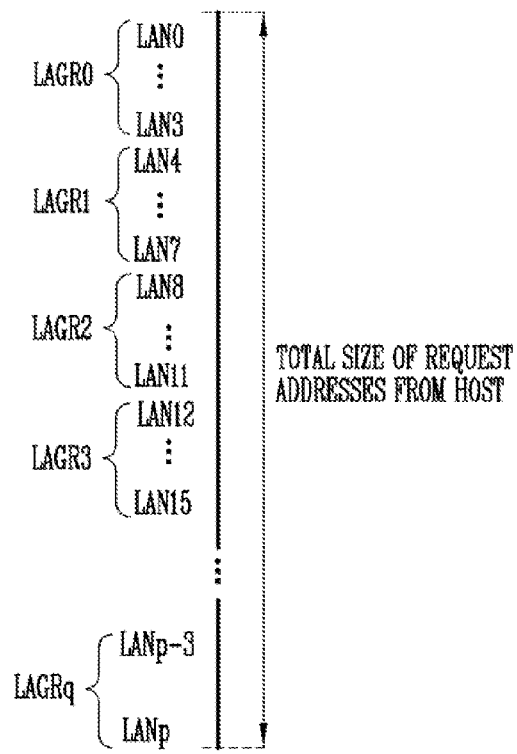
FIG. 3 is a conceptual diagram illustrating a total size of request addresses received from a host of FIG. 2.

FIG. 3 is a conceptual diagram illustrating a total size of request addresses received from a host of FIG. 2.

Referring to FIG. 3, the host may transmit first to (p+1)-th logical addresses LAN0 to LANp to the memory system 10. According to an embodiment of the present invention, the first to (p+1)-th logical addresses LAN0 to LANp may be divided into a plurality of logical address groups LAGR0 to LAGRq. For example, as shown in FIG. 3, each logical address group may include four logical addresses. The logical address group in which each logical address is included may be determined as a quotient obtained by dividing a corresponding logical address by 4. In FIG. 3, the first to fourth logical addresses LAN0 to LAN3 may configure a first logical address group LAGR0. The fifth to eighth logical addresses LAN4 to LAN7 may configure a second logical address group LAGR1. The ninth to twelfth logical addresses LAN8 to LAN11 may configure a third logical address group LAGR2. The thirteenth to sixteenth logical addresses LAN12 to LAN15 may configure a fourth logical address group LAGR3. The (p−2)-th to (p+1)-th logical addresses LANp−3 to LANp may configure a (q+1)-th logical address group LAGRq.

The FTL (220, refer to FIG. 1) may determine the logical address group in which each of the logical addresses of the second map table MPT2 is included, and thus generate meta information METI.

Figure 4:
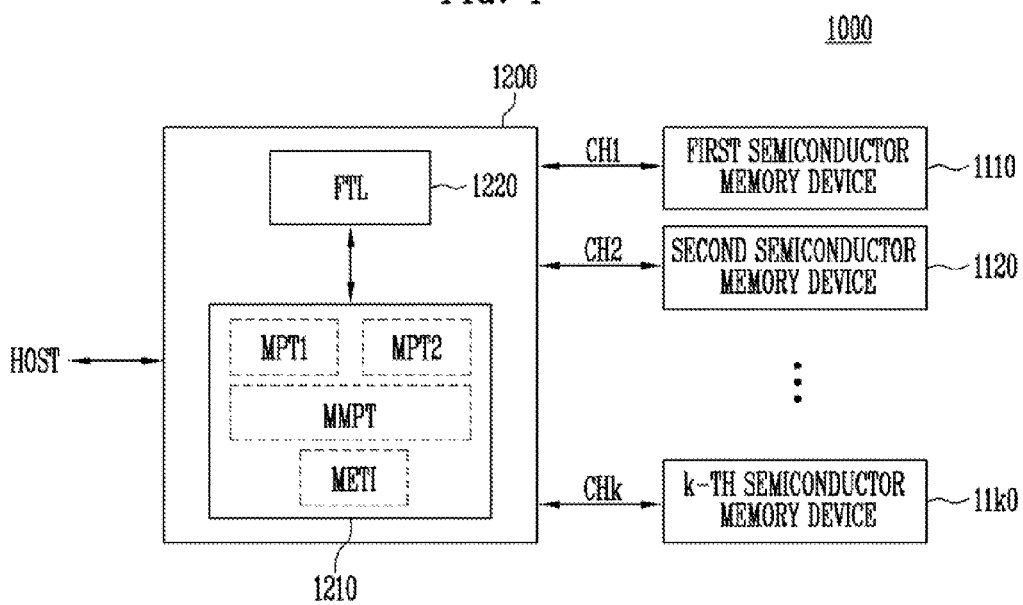
FIG. 4 is a block diagram illustrating a modified embodiment of the memory system of FIG. 1 according to an exemplary embodiment of the present invention.

FIG. 4 is a block diagram illustrating a modified embodiment 1000 of the memory system 10 shown in FIG. 1 according to an exemplary embodiment of the present invention.

Referring to FIG. 4, the memory system 1000 may include a plurality of semiconductor memory devices 1110 to 11*k*0 and a memory controller 1200.

Each of first to k-th semiconductor memory devices 1110 to 11*k*0 may have the same configuration and operation as the semiconductor memory device 100 described with reference to FIG. 1.

The memory controller 1200 may include a RAM 1210 and a flash translation layer (FTL) 1220.

The memory controller 1200 may communicate with the first to k-th semiconductor memory devices 1110 to 11*k*0 through first to k-th channels CH1 to CHk.

The FTL 1220 may be configured to control each semiconductor memory device like the FTL 220 described with reference to FIG. 1.

The FTL 1220 may access the semiconductor memory devices 1110 to 11*k*0 at the request of the host. The FTL 1220 may update the mapping relation between the request address and the physical address in the first or second map table MPT1 or the MPT2 in the program operation. When the physical address corresponds to the first memory block group (BLKG1, refer to FIG. 2), the first map table MPT1 may be updated. When the physical address corresponds to the second memory block group (BLKG2, refer to FIG. 2), the second map table MPT2 may be updated. The FTL 1220 may store the mapping information of the main map table MMPT, which includes the mapping relation between the pages of the memory blocks BLK1 to BLKz and the corresponding physical addresses in the RAM 1210, and update the main map table MMPT based on the first and second map tables MPT1 and MPT2.

Figure 5:
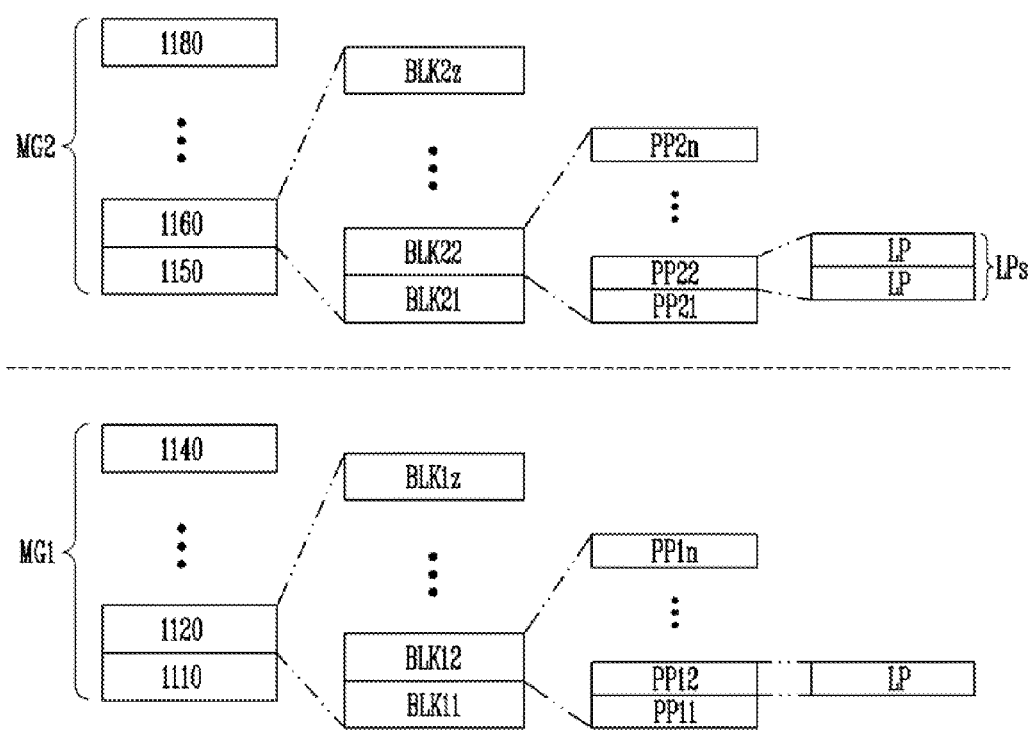
FIG. 5 is a diagram illustrating memory blocks included in semiconductor memory devices of FIG. 4.

FIG. 5 is a diagram illustrating memory blocks included in the semiconductor memory devices 1110 to 11k0 of FIG. 4. In FIG. 5, for a simplified explanation, an example is used in which eight semiconductor memory devices 1110 to 1180 are provided.

As an embodiment, each semiconductor memory device may include single-level cells or multi-level cells. Referring to FIG. 5, the plurality of semiconductor memory devices 1110 to 1180 may be divided into a plurality of memory groups MG1 and MG2. First to fourth semiconductor memory devices 1110 to 1140 may include the single-level cells and may be grouped in a first memory group MG1. Fifth to eighth semiconductor memory devices 1150 to 1180 may include the multi-level cells and may be grouped in a second memory group MG2.

Each of the semiconductor memory devices 1110 to 1140 of the first memory group MG1 may include first to z-th memory blocks BLK11 to BLK1z, and each of the first to z-th memory blocks BLK11 to BLK1z may include first to n-th physical pages PP11 to PP1n. Since memory cells of the first memory group MG1 are the single-level cells, the first to n-th physical pages PP11 to PP1n may include one logical page LP.

Each of the semiconductor memory devices 1150 to 1180 of the second memory group MG2 may include first to z-th memory blocks BLK21 to BLK2z, and each of the first to z-th memory blocks BLK21 to BLK2z may include first to n-th physical pages PP21 to PP2n. Since memory cells of the second memory group MG2 are the multi-level cells, each of the first to n-th physical pages PP21 to PP2n may include a plurality of logical pages LPs, for example, two logical pages LPs.

The inventive concept of the present invention may be also applied to an embodiment of FIG. 4. That each semiconductor memory device included in the memory system (1000, refer to FIG. 4) includes the single-level cells or the multi-level cells may mean that each memory block included in the memory system 1000 includes the single-level cells or the multi-level cells. For example, the memory block BLK12 of FIG. 5 may include the single-level cells, and thus each physical page of the memory block BLK12 may include one logical page LP. For example, the memory block BLK22 may include the multi-level cells, and thus each physical page of the memory block BLK22 may include the plurality of logical pages LPs.

Hereinafter, for a simple explanation, an embodiment of the present invention will be described with reference to FIG. 1.

FIG. 6 is a diagram showing the first map table MPT1 of FIG. 1.

Referring to FIG. 6, the logical addresses and corresponding physical addresses may be stored in the first map table MPT1. When the request address for a program operation is received from the host, the FTL 220 may map a specific physical address. The FTL 220 may map the physical address corresponding to the first memory block group (BLKG1, refer to FIG. 2) when random request addresses are received. For example, the host (refer to FIG. 1) may repeatedly transfer a request of a program operation on the request address corresponding to one sector. The transferred request addresses (for example, LAN100, LAN200, LAN50, LAN77, and LAN 140) may be mapped to the page in the first memory block group BLKG1.

In FIG. 6, the logical address LAN100 may be mapped to the first physical page PP11. The logical address LAN200 may be mapped to the second physical page PP12 of the second memory block BLK2. The logical address LAN50 may be mapped to the third physical page PP13 of the second memory block BLK2. The logical address LAN77 may be mapped to the fourth physical page PP14 of the second memory block BLK2. The logical address LAN140 may be mapped to the fifth physical page PP15 of the second memory block BLK2.

FIG. 7 is a diagram showing the second map table MPT2 of FIG. 1.

Referring to FIG. 7, the second map table MPT2 may include logical addresses and corresponding physical addresses. The FTL 220 may map each of the request addresses to the physical address corresponding to the second memory block group (BLKG2, refer to FIG. 2) when the request addresses for a program operation are sequentially received. For example, the host may specify the request addresses by transferring information regarding a starting sector (for example, LAN0) and the number of sectors (for example, 7). Each of the transferred request addresses (for example, LAN0 to LAN6) may be mapped to the page in the second memory block group BLKG2.

In FIG. 7, the first and second logical addresses LAN0 and LAN1 may be mapped to the logical pages LP1 and LP2 of the first physical page PP21 in the x-th memory block BLKx. The third and fourth logical addresses LAN2 and LAN3 may be mapped to the logical pages LP1 and LP2 of the second physical page PP22 in the x-th memory block BLKx. The fifth and sixth logical addresses LAN4 and LAN5 may be mapped to the logical pages LP1 and LP2 of the third physical page PP23 in the x-th memory block BLKx. The seventh logical address LAN6 may be mapped to the logical page LP1 of the fourth physical page PP24 in the x-th memory block BLKx. The $(4r+1)$-th and $(4r+2)$-th logical addresses LAN4$r$ and LAN4$r$+1 may be mapped to the logical pages LP1 and LP2 of the first physical page PP21 in the (x+1)-th memory block BLKx+1. The $(4r+3)$-th logical address LAN4$r$+2 may be mapped to the logical page LP1 of the second physical page PP22 in the (x+1)-th memory block BLKx+1.

As a result, the x-th and (x+1)-th memory blocks BLKx and BLKx+1 may store data corresponding to sequential logical addresses.

FIG. 8 is a diagram showing the main map table MMPT of FIG. 1.

Referring to FIG. 8, the main map table MMPT may store the logical addresses LAN0 to LANp that are capable of being received from the host, and corresponding physical addresses PAN0 to PANp. Each physical address may include information regarding a specific physical page and logical page.

As an embodiment, only one portion among the main map table MMPT may be stored in the RAM 210 based on a storage space for storing the main map table MMPT. For example, the main map table MMPT may be stored in the meta block in the semiconductor memory device 100, and only one portion of the main map table MMPT may be loaded to the RAM 210.

FIG. 9 is a diagram for describing the meta information METI according to an embodiment of the present invention.

Referring to FIG. 9, the meta information METI may be generated based on the logical addresses LAN0 to LAN6 and LAN4r to LAN4r+2 Included in the second map table MPT2. The FTL 220 may define the logical address groups in which the logical addresses included in the second map table MPT2 are included as the meta information METI.

For example, the logical address group may be determined as a quotient obtained by dividing each logical address by 4. As shown in FIG. 9, the first to fourth logical addresses LAN0 to LAN3 may be determined as the first logical address group LAGR0. The fifth to seventh logical addresses LAN4 to LAN6 may be determined as the second logical address group LAGR1. The (4r+1)-th to (4r+3)-th logical addresses LAN4r to LAN4r+2 may be determined as the (r+1)-th logical address group LAGRr.

Sequential logical addresses LAN0 to LAN6 and LAN4r to LAN4r+2 may be included in the second map table MPT2. Accordingly, the number of the logical address groups LAGR0, LAGR1, and LAGRr included in the meta information METI may be smaller than the number of logical addresses LAN0 to LAN6 and LAN4r to LAN4r+2 included in the second map table MPT2.

Figure 10:
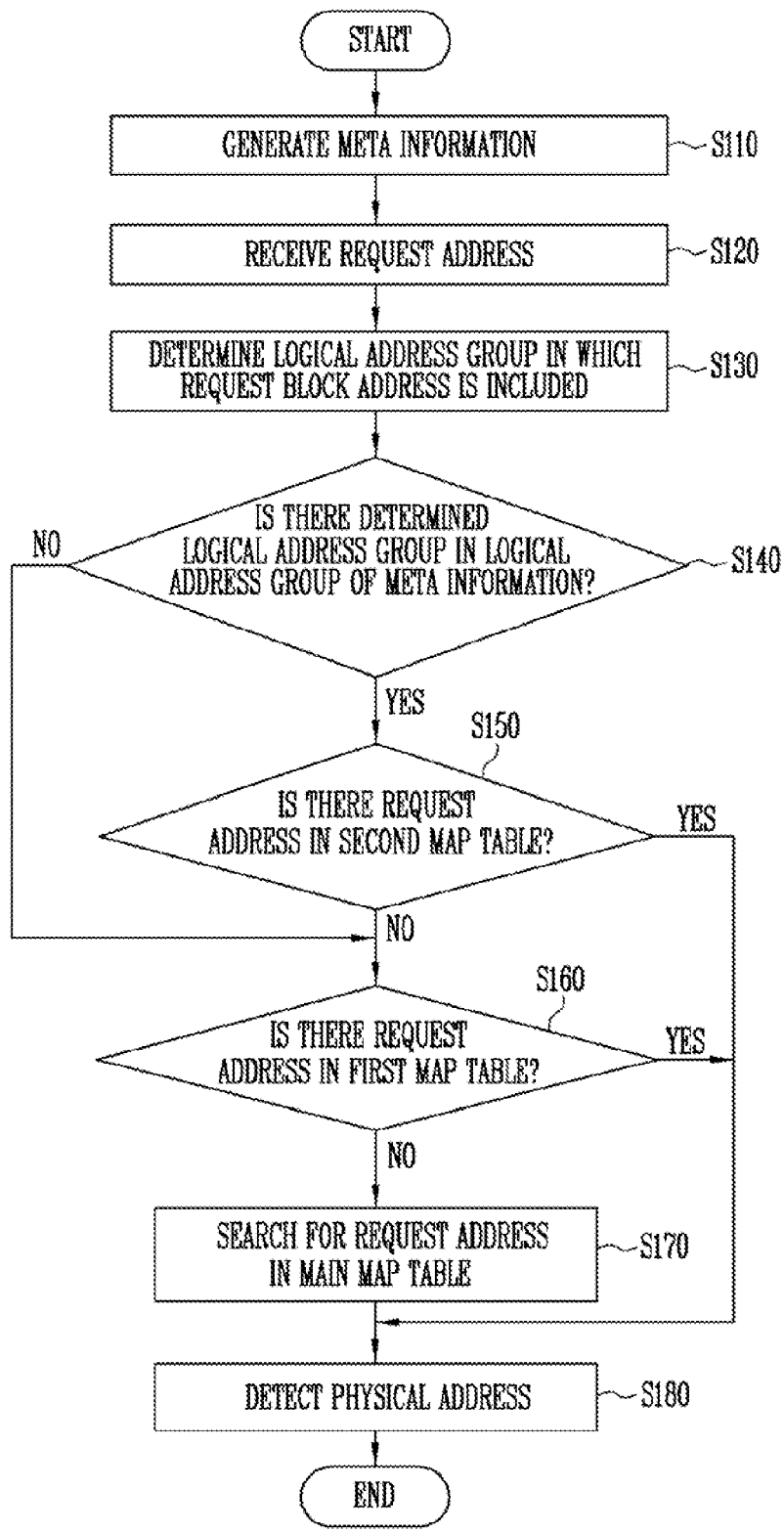
FIG. 10 is a flowchart for describing an operation method of a controller according to an embodiment of the present invention.

FIG. 10 is a flowchart for describing an operation method of the controller 200 according to an embodiment of the present invention.

Referring to FIGS. 1, 7, and 10, in an operation S110, the controller 200 may generate the meta information METI. The controller 200 may determine the logical address groups in which the logical addresses of the second map table MPT2 are included, and generate the determined logical address groups as the meta information METI.

In an operation S120, the request address for a read operation may be received from the host. Accordingly, it may be necessary to detect the physical address corresponding to the request address.

In an operation S130, first, the controller 200 may determine the logical address group in which the request address is included. For example, the controller 200 may calculate a quotient by dividing the request address by 4.

In an operation S140, the controller 200 may detect whether the determined logical address group is in the logical address groups (LAGR0, LAGR1, and LAGRr, refer to FIG. 9) included in the meta information METI. When the determined logical address group is present, an operation S150 may be performed. When the determined logical address group is not present, an operation S160 may be performed.

In the operation S150, the controller 200 may search for the request address in the second map table MPT2. That is, the controller 200 may selectively search the second map table MPT2 based on whether the determined logical address group is in the logical address groups (LAGR0, LAGR1, and LAGRr, refer to FIG. 9) included in the meta information METI.

When the request address is not in the second map table MPT2, the operation S160 may be performed. When the request address is in the second map table MPT2, an operation S180 may be performed.

For example, assume that the request address is the seventh logical address LAN6. The request address may be included in the second logical address group LAGR1, and the second logical address group LAGR1 may be included in the logical address groups LAGR0, LAGR1, and LAGRr of the meta information METI. Accordingly, the request address may be searched in the second map table MPT2. As shown in FIG. 6, when the seventh logical address LAN6 is included in the second map table MPT2, the searching in the operation S150 may succeed. In this case, the logical address LP1 of the fourth physical page PP24 of the x-th memory block BLKx may be detected as the physical address.

For example, assume the request address is the eighth logical address LAN7. The request address may be included in the second logical address group LAGR1, and the second logical address group LAGR1 may be included in the logical address groups LAGR0, LAGR1, and LAGRr of the meta information METI. Accordingly, the request address may be searched in the second map table MPT2. As shown in FIG. 6, however, when the eighth logical address LAN7 is not included in the second map table MPT2, the searching in the operation S150 may fail.

In the operations S160 and S170, the first map table MPT1 and the main map table MMPT may be sequentially searched. In the operation S160, the controller 200 may search for the request address in the first map table MPT1. When the request address is not in the first map table MPT1, the operation S170 may be performed. When the request address is in the first map table MPT1, the operation S180 may be performed.

In the operation S170, the controller 200 may search for the request address in the main map table MMPT.

In the operation S180, the controller 200 may detect the physical address from the map table in which the searching succeeded. The detected physical address may be provided to the semiconductor memory device 100.

According to an embodiment of the present invention, whether the logical address group, in which the request address is included, is in the meta information METI may be detected, and the first map table MPT1 may be selectively searched based on the detecting result. Omitting the searching on the first map table MPT1 may mean that the time used for detecting the physical address is reduced. As the storage capacity of the first map table MPT1 is increased, the time used may be greatly reduced by omitting the searching on the first map table MPT1. Accordingly, the operating speed of the memory system 10 may be improved.

Figure 11:
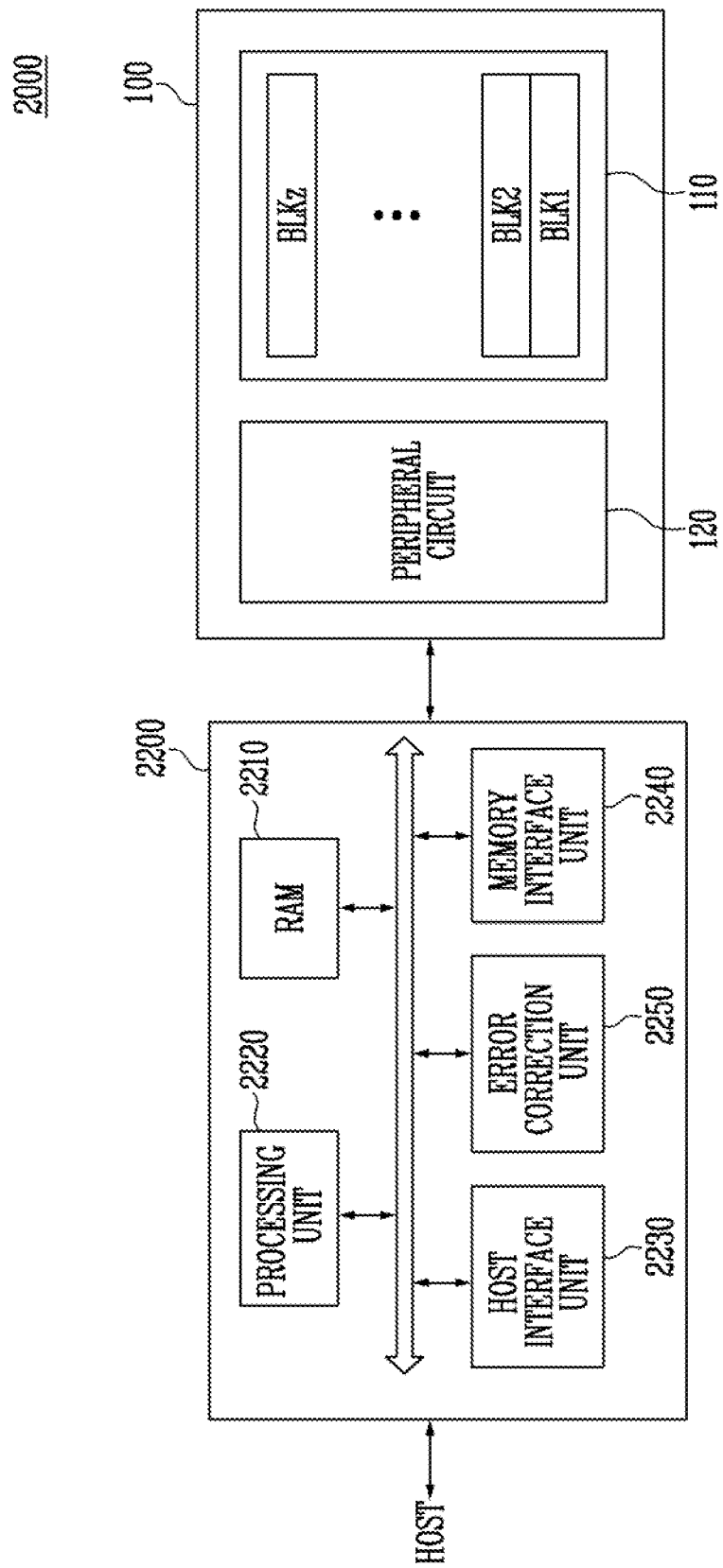
FIG. 11 is a block diagram illustrating an implementation example of the memory system of FIG. 1.

FIG. 11 is a block diagram illustrating an implementation example 2000 of the memory system 10 of FIG. 1.

Referring to FIG. 11, the memory system 2000 may include a semiconductor memory device 100 and a controller 2200.

The semiconductor memory device 100 may have the same configuration and operation as the semiconductor memory device described with reference to FIG. 1. Hereinafter, duplicated descriptions will be omitted.

The controller 2200 may be connected to the host and the semiconductor memory device 100. The controller 2200 may include a RAM 2210, a processing unit 2220, a host interface unit 2230, a memory interface unit 2240, and an error correction unit 2250.

The RAM 2210 may be used as at least one among an operating memory of the processing unit 2220, a cache memory between the semiconductor memory device 100 and the host, and a buffer memory between the semiconductor memory device 100 and the host. The processing unit 2220 may control various operations of the controller 2200. The processing unit 2220 and the RAM 2210 may perform a function of the FTL 220 described with reference to FIG. 1. For example, a program code for performing a function of the FTL 220 may be stored in the semiconductor memory device 100 and loaded to the RAM 2210, and the processing unit 2220 may perform the function of the FTL 220 by executing the program code loaded on the RAM 2210. For example, the processing unit 2220 may perform the function of the FTL 220 by driving firmware.

The host interface unit 2230 may include a protocol for performing data exchange between the host and the controller 2200. As an embodiment, the controller 2200 may be configured to communicate with the host through at least one among various protocols such as a universal serial bus (USB) protocol, a multimediacard (MMC) protocol, a parallel component interconnect (PCI) protocol, a PCI-express (PCI-E), an advanced technology attachment (ATA) protocol, a serial ATA (SATA) protocol, a parallel ATA (PATA) protocol, a small computer system interface (SCSI) protocol, an enhanced small disk interface (ESDI) protocol, an integrated drive electronics (IDE) protocol, a private protocol, etc.

The memory interface unit 2240 may interface with the semiconductor memory device 100. For example, the memory interface unit 2240 may be a NAND interface unit or a NOR interface unit.

The error correction unit 2250 may be configured to detect and correct an error of data received from the semiconductor memory device 100 using an error correcting code (ECC).

The controller 2200 and the semiconductor memory device 100 may be integrated into a single semiconductor device. As an embodiment, the controller 2200 and the semiconductor memory device 100 may configure a memory card by being integrated into a single semiconductor device. For example, the controller 2200 and the semiconductor memory device 100 may configure a memory card such as a PC card (personal computer memory card international association, PCMCIA), a compact flash (CF) card, a smart media (SM) card (SMC), a memory stick, a multimedia card (MMS, RS-MMC, MMCmicro), a secure digital (SD) card (SD, miniSD, microSD, SDHC), a universal flash storage (UFS) device, etc.

The controller 2200 and the semiconductor memory device 100 may configure a solid state drive (SSD) by being integrated into a single semiconductor device. The SSD may include a storage device configured to store data in a semiconductor memory. When the memory system 2000 is used as an SSD, the operating speed of the host connected to the memory system 2000 may be dramatically improved.

As another exemplary embodiment, the memory system 2000 may be provided as one among various components of an electronic device such as a computer, an ultra mobile personal computer (UMPC), a workstation, a net-book, a personal digital assistant (PDA), a portable computer, a web tablet, a wireless phone, a mobile phone, a smart phone, an e-book, a portable multimedia player (PMP), a portable game console, a navigation device, a black box, a digital camera, a three-dimensional television, a digital audio recorder, a digital audio player, a digital picture recorder, a digital picture player, a digital video recorder, a digital video player, a device for wirelessly transmitting and receiving information, one among various electronic devices configuring a home network, one among various electronic devices configuring a computer network, one among various electronic devices configuring a telematics network, a radio frequency identification (RFID) device, or one among various components configuring a computing system.

As an exemplary embodiment, the semiconductor memory device 100 or the memory system 2000 may be packaged in various types of packages. For example, the semiconductor memory device 100 or the memory system 2000 may be packaged and mounted in a manner such as a package on package (PoP), a ball grid array (BGA), a chip scale package (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat package (MQFP), a thin quad flat package (TQFP), a small outline integrated circuit (SOIC), a shrink small outline package (SSOP), a thin small outline package (TSOP), a system in package (SIP), a multi chip package (MCP), a wafer-level fabricated package (WFP), a wafer-level processed stack package (WSP), or the like.

According to an embodiment of the present invention, whether there is a logical address group with a request address included in the meta information may be detected, and the first map table may be selectively searched based on the detected result. Accordingly, a memory system having improved operating speed may be provided.

According to an embodiment of the present invention, a memory system and a method of operating the same having improved operating speed may be provided.

The technical spirit of the present invention described above has been described with reference to exemplary embodiments in detail, but it should be noted that the embodiments are used for the description only and are not for limiting the scope of the present invention. Therefore, it will be understood by those of ordinary skill in the art that various changes in form and details may be made without departing from the spirit and scope of the present invention as defined by the following claims.

What is claimed is:

1. A method of operating a memory system comprising a semiconductor memory device that comprises first memory blocks having multi-level cells, the method comprising:
   storing a first map table including a mapping relation between first physical addresses specifying pages of the first memory blocks and first logical addresses among a plurality of logical addresses, wherein the plurality of logical addresses are received from a host as a request address and divided into a plurality of logical address groups;
   storing first logical address groups of the first logical addresses, among the plurality of logical address groups, as meta information;
   determining a logical address group in which the request address is included, among the plurality of logical address groups as a second logical address group; and
   detecting whether there is the second logical address group in the first logical address groups of the meta information, and searching for the request address in the first map table based on the detecting result,
   wherein the meta information includes the first logical address groups by grouping the first logical addresses having the same quotient when divided by 4.

2. The method of operating the memory system of claim 1, wherein the searching of the request address is performed when the second logical address group is in the first logical address groups of the meta information.

3. The method of operating the memory system of claim 1, wherein the semiconductor memory device further comprises second memory blocks having single-level cells.

4. The method of operating the memory system of claim 3, further comprising:
   storing a second map table including a mapping relation between second physical addresses specifying pages of the second memory blocks and second logical addresses among the plurality of logical addresses.

5. The method of operating the memory system of claim 4, further comprising:
searching for the request address in the second map table when the second logical address group is not in the first logical address groups of the meta information.

6. The method of operating the memory system of claim 5, further comprising:
storing a third map table including a mapping relation between the plurality of logical addresses and third physical addresses,
wherein the third physical addresses specify the pages of the first and second memory blocks.

7. The method of operating the memory system of claim 6, further comprising:
detecting a physical address corresponding to the request address from the second map table when the request address is in the second logical addresses in the second map table; and
searching for the request address in the third map table when the request address is not in the second logical addresses in the second map table.

8. The method of operating the memory system of claim 7, further comprising:
detecting a physical address corresponding to the request address from the third map table.

9. A memory system, comprising:
a semiconductor memory device including first memory blocks having multi-level cells and second memory blocks having single-level cells; and
a controller configured to control the semiconductor memory device based on a plurality of logical addresses, wherein the plurality of logical addresses are received from a host as a request address and divided into a plurality of logical address groups,
wherein the controller comprises:
a RAM configured to store a first map table including a mapping relation between first physical addresses specifying pages of the first memory blocks and first logical addresses among the plurality of logical addresses; and
a flash translation layer configured to store first logical address groups of the first logical addresses, among the plurality of logical address groups, as meta information in the RAM, and
wherein the flash translation layer determines a logical address group in which the request address is included, among the plurality of logical address groups as a second logical address group, and searches for the request address in the first map table when the second logical address group is in the first logical address groups of the meta information, and
wherein the meta information includes the first logical address groups by grouping the first logical addresses having the same quotient when divided by 4.

10. The memory system of claim 9, wherein the RAM stores a second map table including a mapping relation between second physical addresses specifying pages of the second memory blocks and second logical addresses among the plurality of logical addresses.

11. The memory system of claim 10, wherein the flash translation layer searches for the request address in the second map table when the second logical address group is not in the first logical address groups of the meta information.

12. The memory system of claim 10, wherein the flash translation layer detects a physical address corresponding to the request address from the first map table when the request address is detected from the first map table, and searches for the request address in the second map table when the request address is not detected from the first map table.

13. The memory system of claim 9, wherein the RAM stores a third map table including a mapping relation between the plurality of logical addresses and third physical addresses, and the third physical addresses specify the pages of the first and second memory blocks.

14. The memory system of claim 13, wherein the flash translation layer searches for the request address in the third map table when the second logical address group is not in the first logical address groups of the meta information.

15. The memory system of claim 13, wherein the flash translation layer detects a physical address corresponding to the request address from the first map table when the request address is detected from the first map table, and searches for the request address in the third map table when the request address is not detected from the first map table.

* * * * *